United States Patent [19]
Ito et al.

[11] 4,322,130
[45] Mar. 30, 1982

[54] PHASE SHIFTING MIRROR
[75] Inventors: Susumu Ito, Tokyo; Mikichi Ban, Yokohama, both of Japan
[73] Assignee: Canon Kabushiki Kaisha, Japan
[21] Appl. No.: 79,086
[22] Filed: Sep. 26, 1979
[30] Foreign Application Priority Data
Sep. 29, 1978 [JP] Japan ................................ 53-120488
[51] Int. Cl.³ ............................................. G02B 5/08
[52] U.S. Cl. ...................................... 350/288; 350/1.7
[58] Field of Search ................. 350/1.6, 1.7, 164, 166, 350/288–290

[56] References Cited
U.S. PATENT DOCUMENTS
4,239,338 12/1980 Borrelli et al. ...................... 350/164

OTHER PUBLICATIONS
Reale, C. "Metallic Films Coated with Dielectric Layers", Manufacturing Optics International, IPC Business Press Ltd., 1969, Jul. 1969, vol. 22, No. 1, pp. 9–14.

Primary Examiner—John K. Corbin
Assistant Examiner—Bruce Y. Arnold
Attorney, Agent, or Firm—Fitzpatrick, Cella, Harper & Scinto

[57] ABSTRACT

A phase shifting mirror comprising a thin film layer of metal provided on a substrate, and a thin film layer of dielectric material provided on said thin film layer of metal, wherein by utilization of a phase difference between a P-polarization reflected component and an S-polarization reflected component resulting from the reflection on the boundary surface between the layer of metal and the layer of dielectric material and variations in refractive index and film thickness of the dielectric material, a desired phase difference is obtained between the P-polarization reflected component and the S-polarization reflected component.

8 Claims, 39 Drawing Figures

PHASE SHIFTING MIRROR

BACKGROUND OF THE INVENTION

1. Field of the Invention

This invention relates to a phase shifting mirror for creating a desired phase difference between the P-polarization reflected component and the S-polarization reflected component of a reflected light beam.

2. Description of the Prior Art

A phenomenon is known that when a light beam is reflected by the surface of a certain substance, a phase difference is created between a P-polarization reflected component and an S-polarization reflected component. For example, when a light beam is reflected by the outer surface of a dielectric material, a phase difference $\pi$ is created between the P-polarization reflected component and the S-polarization reflected component if the angle of incidence is smaller than the Brewster's angle.

In the metals generally used for a mirror, namely, aluminum, silver, chromium, etc., when a light beam is reflected by the surface thereof, a phase difference of approximately ($\pi/2$) is created between the P-polarization component and the S-polarization component. In this case, the angle of incidence at which the light beam is incident on the metal surface is about 45°, which is usually a standard value when the metal is used as a mirror.

Further, when a light beam is reflected by the surface of a mirror comprising a layer of dielectric material provided on the metal layer and having a film thickness of ¼ of the design wavelength or a film thickness of a value which is an integer times as great as that, a phase difference of approximately ($\pi/2$) is created between the P-polarization component and the S-polarization component. Thus, in the mirror of such conventional surface reflection type, a phase difference of approximately $\pi$ is obtained between the P-polarization component and the S-polarization component during reflection, but if a phase difference substantially different from $\pi$ is to be obtained, the refractive index chiefly of the external medium and the refractive index of the substance which reflects the light beam must be varied. However, a substance corresponding to the refractive index of the substance obtained in calculation does not exist in the natural world.

SUMMARY OF THE INVENTION

It is an object of the present invention to provide a phase shifting mirror in which a phase difference substantially different from $\pi$ may be obtained between the P-polarization reflected component and the S-polarization reflected component due to surface reflection.

It is a further object of the present invention to provide a phase shifting mirror in which chiefly said phase difference has a value sufficiently smaller than $\pi$, namely, a phase shifting mirror in which chiefly the difference between the P-polarization reflected component and the S-polarization reflected component is small.

It is still a further object of the present invention to provide a phase shifting mirror in which the difference between the P-polarization reflected component and the S-polarization reflected component is approximately ($\frac{3}{4}$) $\pi$ and the difference between the energy of the P-polarization reflected component and the energy of the S-polarization reflected component is small.

It is still a further object of the present invention to provide a phase shifting mirror in which a desired phase difference may be obtained by simple means.

It is a further object of the present invention to provide a phase shifting mirror which has both a desired phase difference and a good reflection factor characteristic at the same time.

The phase shifting mirror according to the present invention is a mirror comprising a metal layer provided on a substrate and a dielectric layer provided on the metal layer and in such mirror, by utilizing the phase difference between a P-polarization reflected component and an S-polarization reflected component primarily determined by the refractive indices of the dielectric layer and the metal layer and the angle of incidence of a light beam and in addition, a variation in film thickness of the dielectric layer, there is provided a desired phase difference between the P-polarization reflected component and the S-polarization reflected component.

Further, in the phase shifting mirror according to the present invention, if the dielectric layer comprises a single layer, it is desirable that the optically effective film thickness of the dielectric layer (cosine of the geometrical film thickness x refractive index x angle of refraction) be (1/20) to (1/5), preferably, (1/12) to (1/5), of the design wavelength, namely, the wavelength of light for which a phase difference is to be created, in order that the phase difference created by the phase shifting mirror may be small. Such effective film thickness of the dielectric layer depends on the type of the substrate metal and, if the substrate metal is silver, the film thickness of the single layer dielectric material provided on the silver should desirably be between (1/15.5) and (1/8.47) of the design wavelength, and if the substrate metal is aluminum, said film thickness should desirably be between (1/9.9) and (1/6.42) of the design wavelength, and if the substrate metal is chromium, said film thickness should desirably be between (1/6.21) and (1/5.83) of the design wavelength.

The above-described cases are the cases where the substrate metal is so thick as not to pass light, but in the cases where the substrate metal is so thin as to pass light, the film thickness of the dielectric material becomes somewhat different. For example, if the substrate metal is aluminum and the film thickness thereof is so small as to pass light, the film thickness of the dielectric layer provided on the aluminum film may preferably be between (1/10.5) and (1/6.46) of the design wavelength.

In the phase shifting mirror according to the present invention, the number of the dielectric layers provided on the substrate metal may be more than one.

Thus, in the phase shifting mirror of the present invention, the film thickness of the dielectric layer as a parameter is utilized as the means for adjusting the phase difference between the P- and the S-polarization reflected component, and this increases the degree of freedom of designing and enables a desired phase difference to be obtained even by the use of substances used in the conventional mirrors.

Also, such a phase shifting mirror in which a desired phase difference can be obtained with reflection has advantages that a large-sized mirror can be easily manufactured at low cost, that mirrors having different intensities of reflection can be selected, that the angle of incidence can be freely selected, that the mirror can be easily arranged on an optical system and that the mirror is free of chromatic aberration and spherical aberration.

The invention will become more fully apparent from the following detailed description thereof taken in conjunction with the accompanying drawings.

DESCRIPTION OF THE PREFERRED EMBODIMENTS

Figure 1:
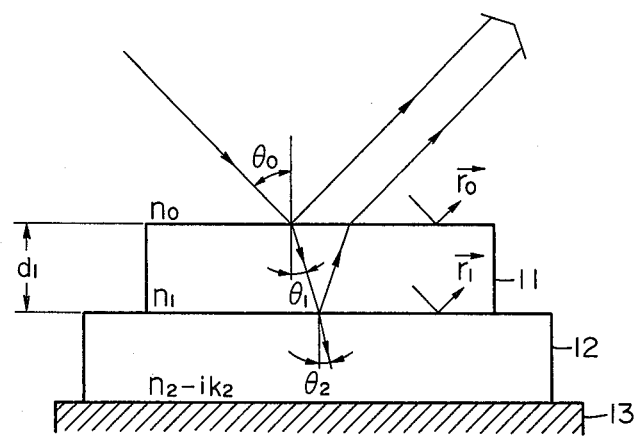
FIGS. 1 and 2 illustrate the principle of the phase shifting mirror according to the present invention.

FIG. 1 illustrates how a phase difference is provided in the phase shifting mirror according to the present invention. In FIG. 1, reference numeral 11 designates a dielectric layer having a refractive index $n_1$ and having a geometrical film thickness $d_1$, reference character 12 designates a metal layer having a refractive index $n_2 - ik_2$ and having a thickness which does not pass light therethrough, and reference numeral 13 denotes a substrate. If the refractive index of a medium on which a light beam is incident is $n_0$ and the angle of incidence is $\theta_0$, the angle of refraction $\theta_1$ in the dielectric layer 11 and the angle of refraction $\theta_2$ in the metal layer 12 may be respectively expressed as follows:

$$\theta_1 = \sin^{-1}\left(\frac{n_0 \cdot \sin\theta_0}{n_1}\right) \tag{1}$$

$$\theta_2 = \sin^{-1}\left(\frac{n_0 \cdot \sin\theta_0}{n_2 - ik_2}\right) \tag{2}$$

However, since $i = \sqrt{-1}$, $\theta_2$ becomes a complex number and may be rewritten as follows:
$$\theta_2 = \alpha + \beta i \tag{3}$$

Next, if the Fresnel number of the P-component and S-component of light in the boundary between the incidence medium and the dielectric layer are expressed as $\vec{\gamma_{0P}}$ and $\vec{\gamma_{0S}}$, respectively, then $$\vec{\gamma_{0P}} = \frac{\tan(\theta_0 - \theta_1)}{\tan(\theta_0 + \theta_1)} \tag{4}$$

$$\vec{\gamma_{0S}} = \frac{\sin(\theta_0 - \theta_1)}{\sin(\theta_0 + \theta_1)} \tag{5}$$

Further, if the Fresnel number of the P-component and S-component of light in the boundary between the dielectric layer 11 and the metal layer 12 are expressed as $\vec{\gamma_{1P}}$ and $\vec{\gamma_{1S}}$, respectively, then $$\vec{\gamma_{1P}} = \frac{\tan\{(\theta_1 - \alpha) - \beta i\}}{\tan\{(\theta_1 + \alpha) + \beta i\}} \tag{6}$$

$$\vec{\gamma_{1S}} = \frac{\sin\{(\theta_1 - \alpha) - \beta i\}}{\sin\{(\theta_1 + \alpha) + \beta i\}} \tag{7}$$

Since $\vec{\gamma_{0P}}$ and $\vec{\gamma_{0S}}$ are real numbers, these may be written as
$$\vec{\gamma_{0P}} = \gamma_{0P}, \quad \vec{\gamma_{0S}} = \gamma_{0S} \tag{8}$$

and since $\vec{\gamma_{1P}}$ and $\vec{\gamma_{1S}}$ are complex numbers, these may be written as $$\vec{\gamma_{1P}} = \gamma_{1P} e^{i\phi_P}, \quad \vec{\gamma_{1S}} = \gamma_{1S} e^{i\phi_S} \tag{9}$$

Here, $\gamma_{1P}$ and $\gamma_{1S}$ represent the magnitudes of amplitude, and $\phi_P$ and $\phi_S$ represent the phases. If the geometrical film thickness of the dielectric layer 11 is $d_1$, the phase delay $D_1$ occurring due to a light of wavelength $\lambda$ reciprocating through the dielectric layer 11 is $$D_1 = \frac{4\pi n_1 d_1 \cos\theta_1}{\lambda}$$

and therefore, the P-component $\vec{\gamma_P}$ and S-component $\vec{\gamma_S}$ of the composite amplitude reflection factor resulting from the interference between the reflected light in the boundary between the incidence medium and the dielectric layer and the reflected light in the boundary between the dielectric layer and the metal layer are respectively expressed as follows:

$$\vec{\gamma_P} = \frac{\gamma_{0P} + \gamma_{1P} e^{i(\phi_P - D_1)}}{1 + \gamma_{0P} \cdot \gamma_{1P} e^{i(\phi_P - D_1)}} = \gamma_P e^{i\delta_P}$$

$$\vec{\gamma_S} = \frac{\gamma_{0S} + \gamma_{1S} e^{i(\phi_S - D_1)}}{1 + \gamma_{0S} \cdot \gamma_{1S} e^{i(\phi_S - D_1)}} = \gamma_S e^{i\delta_S}$$

Here, $\gamma_P$ represents the magnitude of the amplitude of $\vec{\gamma_P}$ and $\delta_P$ represents the phase of $\vec{\gamma_P}$. Accordingly, $$\gamma_P = \sqrt{\vec{\gamma_P}^* \cdot \vec{\gamma_P}}$$

where $\vec{\gamma_P}^*$ is a conjugate complex number of $\gamma_P$. Also, $$\delta_P = \tan^{-1}\left(\frac{A}{B}\right)$$

$$\begin{cases} A = \gamma_{1P}(1 - \gamma_{0P}^2)\sin(\phi_P - D_1) \\ B = \gamma_{0P}(1 + \gamma_{1P}^2) + \gamma_{1P}(1 + \gamma_{0P}^2) \times \cos(\phi_P - D_1) \end{cases}$$

Likewise, as regards the S-component, $\gamma_S$ represents the amplitude of $\vec{\gamma_S}$ and $\delta_S$ represents the phase of $\vec{\gamma_S}$ and, if $\vec{\gamma_S}^*$ is a conjugate complex number of $\vec{\gamma_S}$, $$\gamma_S = \sqrt{\vec{\gamma_S}^* \cdot \vec{\gamma_S}}$$

$$\delta_S = \tan^{-1}\left(\frac{C}{D}\right)$$

$$\begin{cases} C = \gamma_{1S}(1 - \gamma_{0S}^2)\sin(\phi_S - D_1) \\ D = \gamma_{0S}(1 + \gamma_{1S}^2) + \gamma_{1S}(1 + \gamma_{0S}^2)\cos(\phi_S - D_1) \end{cases}$$

From the foregoing, it is seen that the magnitude of amplitude and phase of the reflected light from the mirror having the construction as shown in FIG. 1 depend on the angle of incidence of the light, the wavelength of the light, the refractive index and thickness of the dielectric material, and the refractive index of the metal layer. Accordingly, even if the angle of incidence of the light, the wavelength of the light and the type of the metal layer are determined, the reflection factor and the phase differences of the P- and the S-polarized component can be adjusted by selecting the type and thickness of the dielectric layer.

Description has been made of a mirror as shown in FIG. 1 wherein only one thin dielectric layer is provided on the surface of a metal layer having a great thickness which does not pass light therethrough, but as regards the case where multiple dielectric layers are provided or the case where the metal layer is so thin as to pass light therethrough, the same handling is also possible if the point of view is changed. This will hereinafter be described by reference to FIG. 2.

Figure 2:
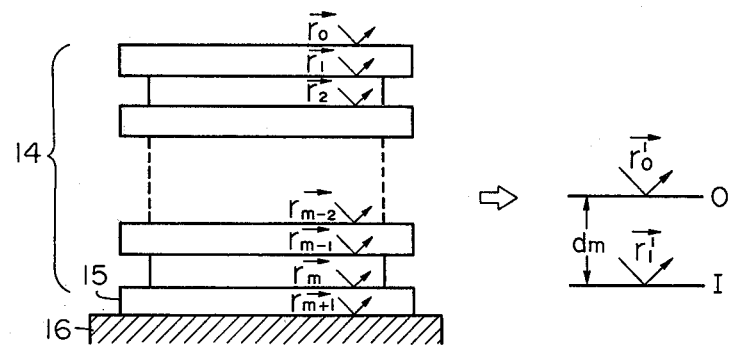

In FIG. 2, reference numeral 14 designates a multilayered dielectric film composed of m layers. The multilayered film 14 is provided on a metal layer 15 provided on a glass substrate 16 and so thin as to pass light therethrough. Let $\vec{\gamma_0}$ be the Fresnel number in the boundary between the incidence medium and the dielectric material, $\vec{\gamma_1}, \vec{\gamma_2}, \ldots, \vec{\gamma_{m-1}}$ be the Fresnel number in the boundaries between the adjacent dielectric layers, and $\vec{\gamma_0}''$ be the composite amplitude reflection factor obtained with the repeated multi-reflection in the respective boundaries taken into account. On the other hand, let $\vec{\gamma_m}$ be the Fresnel number in the boundary between the dielectric layer 14 and the metal layer 15, $\vec{\gamma_{m+1}}$ be the Fresnel reflection in the boundary between the metal layer 15 and the substrate 16, and $\vec{\gamma}'_1$ be the amplitude reflection factor resulting from synthesization of $\vec{\gamma_m}$ and $\vec{\gamma_{m+1}}$ by interference with the repeated multi-reflection taken into account. Then, $\vec{\gamma_0}''$ and $\vec{\gamma_1}''$ may be regarded as the Fresnel number of an imaginary boundary surface 0 and an imaginary boundary surface I with the thickness dm interposed therebetween. That is, after all, the system shown in FIG. 2 is essentially the same as the system shown in FIG. 1 and therefore, the amplitude of the composite amplitude reflection factor and phase of the entire system can be obtained by the same procedure as that involved in the above-described method. That is, even in a mirror having a multilayered dielectric film or a thin metal layer, adjustment of the reflection factor and phase is possible.

Embodiments of the present invention will now be described.

Figure 3A:
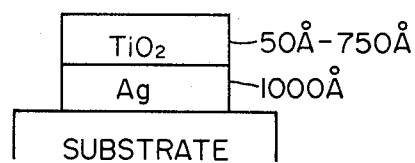
FIGS. 3 to 20 respectively show embodiments of the phase shifting mirror according to the present invention, FIGS. 3 A–20 A showing the film structures and FIGS. 3 B–20 B showing the phase difference between the S-polarization component and the P-polarization component with the film thickness of the dielectric layer as a parameter.
Figure 3B:
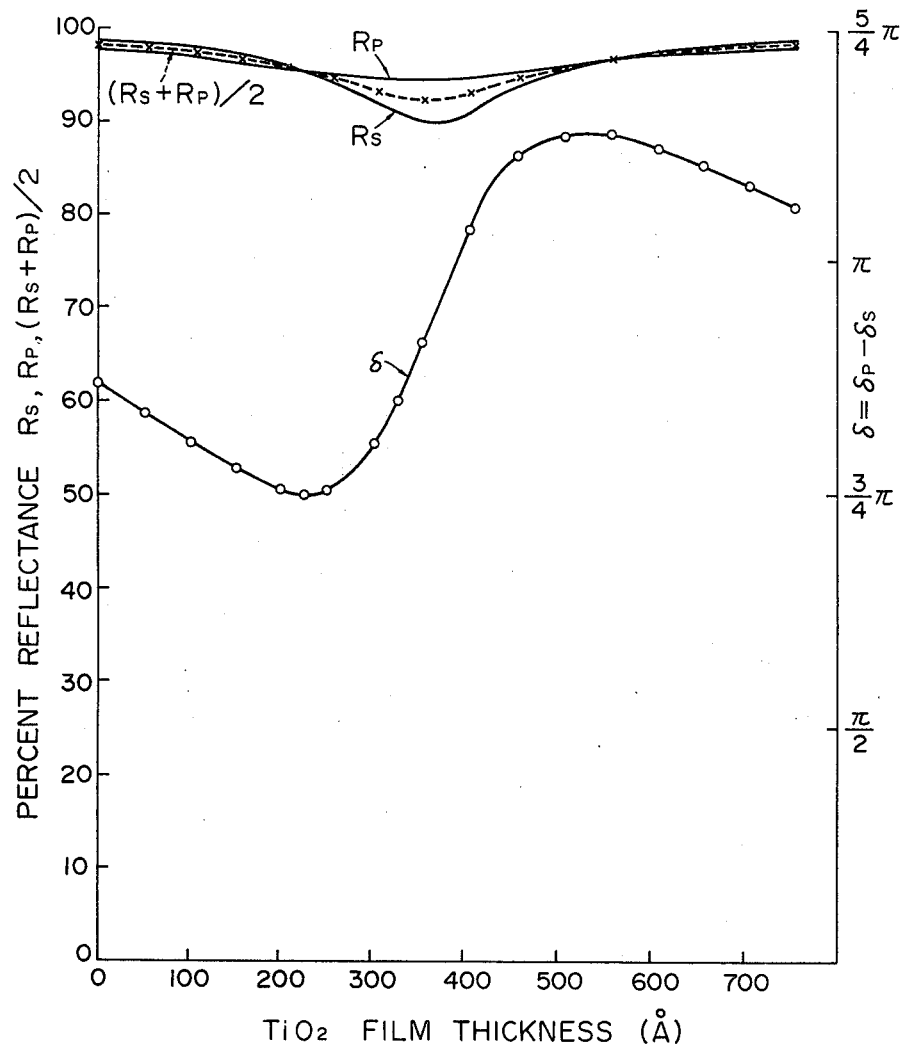

First Embodiment:

As shown in FIG. 3 A, a glass substrate well polished and having the surface thereof kept sufficiently clean was disposed in a vacuum tank maintained at a pressure of $10^{-6} - 5 \times 10^{-5}$ mmHg, and silver was deposited on the glass substrate to a thickness which does not pass light (1000 Å) by the vacuum vaporization technique. Further, titanium dioxide was deposited to a thickness of 50 Å–750 Å by similar vacuum vaporization technique. The reflection factor $R_P$ of the P-polarization reflected component, the reflection factor $R_S$ of the S-polarization reflected component and the average reflection factor $(R_P + R_S)/2$ of the P-polarization and the S-polarization component for the then variation (50 Å–750 Å) in film thickness of titanium dioxide are shown in FIG. 3 B. In FIG. 3 B, the abscissa represents the film thickness of titanium dioxide and the ordinate represents the reflection factors $R_P$, $R_S$ and $(R_p + R_S)/2$. Further, FIG. 3 shows the phase difference $\delta$ ($\delta_p - \delta_S$) between the P-polarization reflected component and the S-polarization reflected component for the variation in film thickness of titanium dioxide. The scale of this phase difference $\delta$ is shown at the right-hand ordinate, and how much the phase of the P-polarization reflected component is advanced with respect to the phase of the S-polarization reflected component, as counter-clockwisely measured, is shown as the phase difference. The wavelength of the light is 5460 Å, and the angle of incidence of the light upon the mirror is 45°.

As is apparent from FIG. 3 B, there was obtained a phase shifting mirror having a reflection factor of 90% or more for the range $(\frac{3}{4})\pi - 2.27/2\pi$ of the phase difference $\delta = \delta_P - \delta_S$. In order that the phase difference $\delta$ may be small, the effective film thickness of TiO$_2$ may be between (1/15.5) and (1/8.47). It is further seen that the energies of $R_S$ and $R_P$ are substantially equal when $\delta$ is in the vicinity of $(\frac{3}{4})\pi$.

The reflection factor characteristics of $R_P$, $R_S$ and $(R_P + R_S)/2$ and phase difference characteristic of $\delta = \delta_P - \delta_S$ shown in FIGS. 4 B to 20 B which correspond to second to eighteenth embodiments which will be shown below are similar to those shown in FIG. 3 and need not be described.

Figure 4A:
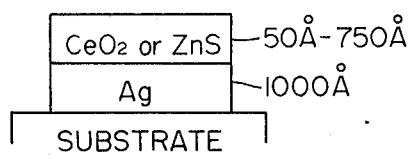
Figure 4B:
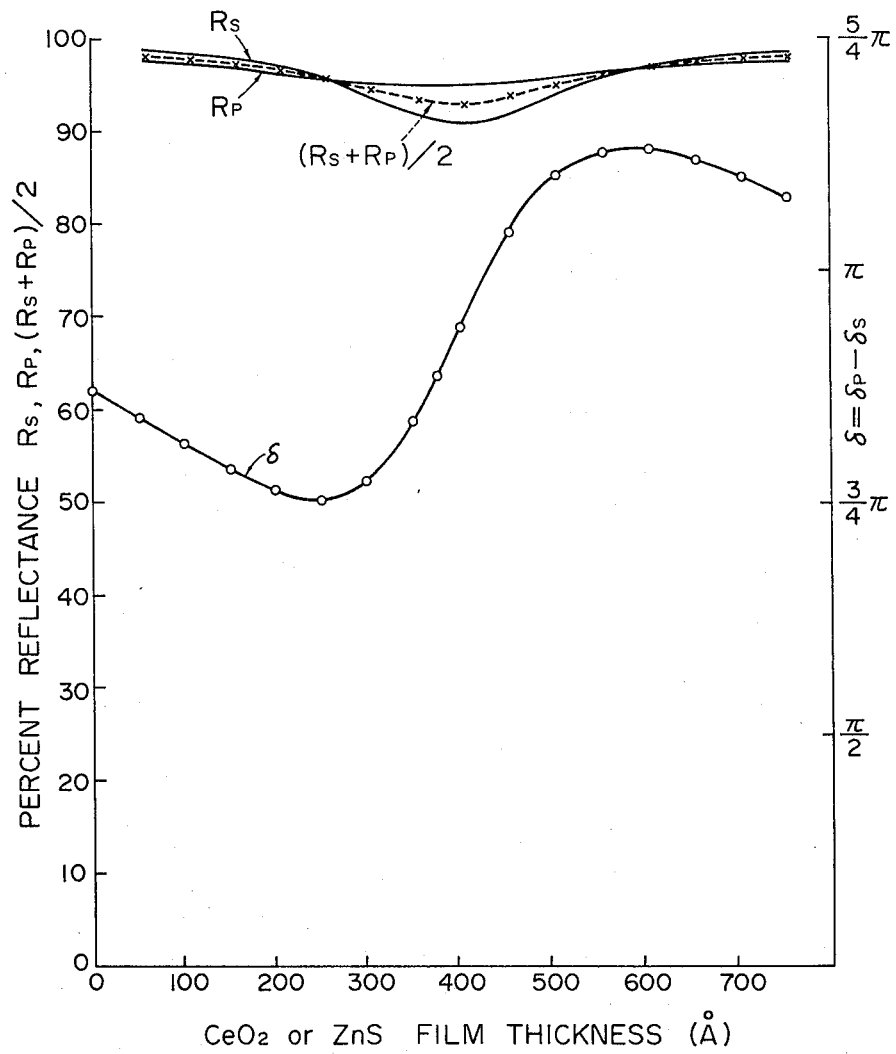

Second Embodiment:

As shown in FIG. 4 A and as in the first embodiment, the surface of silver deposited on a glass substrate by vacuum vaporization was coated with cerium dioxide CeO$_2$ or zinc sulfide ZnS to a thickness of 50–750 Å also by vacuum vaporization. The reflection factors $R_P$, $R_S$ and $(R_P + R_S)/2$ and phase difference $\delta$ of the thus obtained mirror for the angle of incidence 45° and the wavelength of the light 5460 Å are shown in FIG. 4 B.

As shown in FIG. 4 B, there was obtained a phase shifting mirror having a reflection factor of 90% or more for the range $(1.51\pi)/2 - 2.26\pi/2$ of the phase difference $\delta = \delta_P - \delta_S$. In order that the phase difference $\delta$ may be small, the effective film thickness of the dielectric layer may be between (1/16.6) and (1/8.05) of the design wavelength. Further, the energies of $R_S$ and $R_P$ become equal when $\delta$ is in the vicinity of $(\frac{3}{4})\pi$.

Figure 5A:
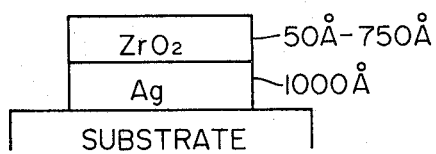
Figure 5B:
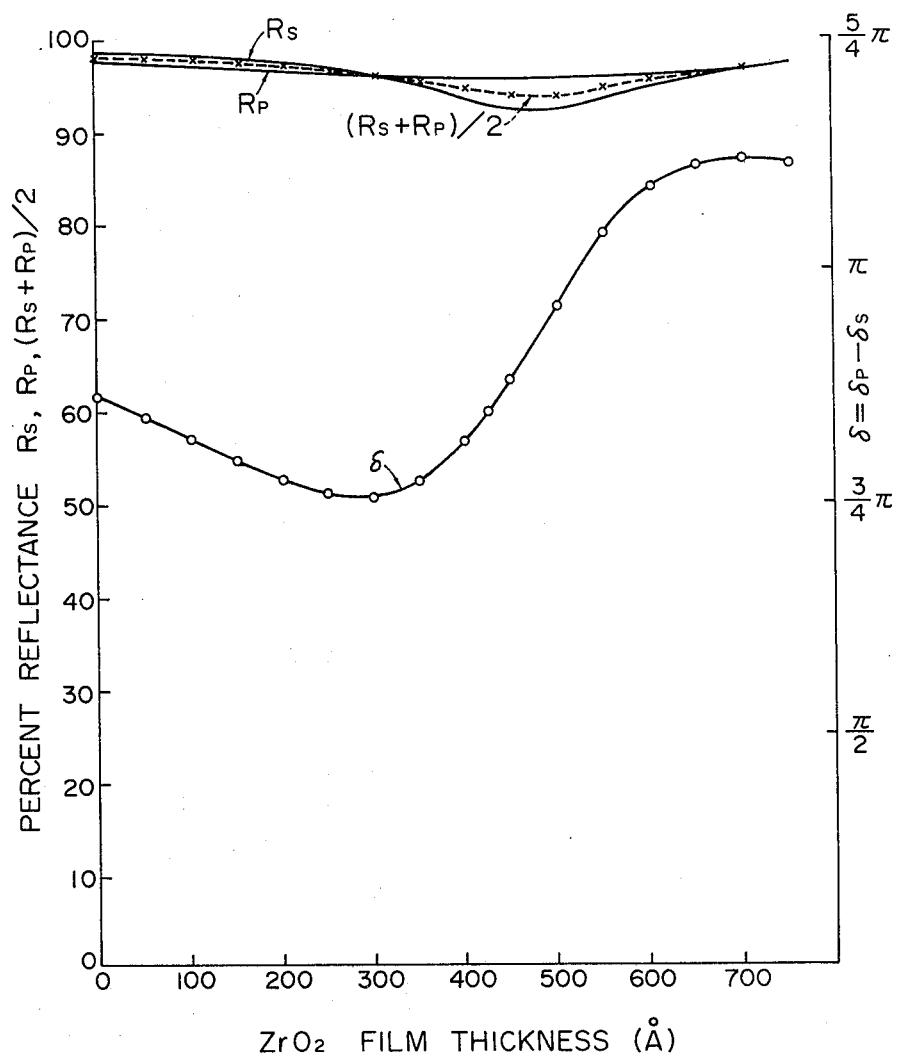

Third Embodiment:

As shown in FIG. 5 A and as in the first embodiment, the surface of silver deposited on a glass substrate by vacuum vaporization was coated with zirconium dioxide $Z\gamma O_2$ to a thickness of 50–750 Å also by vacuum vaporization. The reflection factors and phase difference of the polarization components of the thus obtained mirror for the angle of incidence 45° and the wavelength of the light 5460 Å are shown in FIG. 5 B. As shown in FIG. 5 B, there was obtained a phase shifting mirror having a reflection factor 92% or more for the range 1.52$\pi$/2–2.24$\pi$/2 of the phase difference $\delta = \delta_P - \delta_S$. In order that the phase difference $\delta$ may be small, the film thickness of ZrO$_2$ may be between 1/15.8 and 1/7.9 of the design wavelength. Further, the energies of $R_S$ and $R_P$ become equal when $\delta$ is in the vicinity of $\frac{3}{4}\pi$.

Figure 6A:
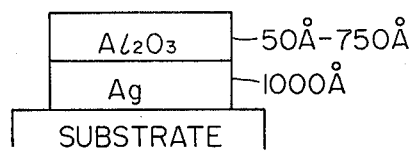
Figure 6B:
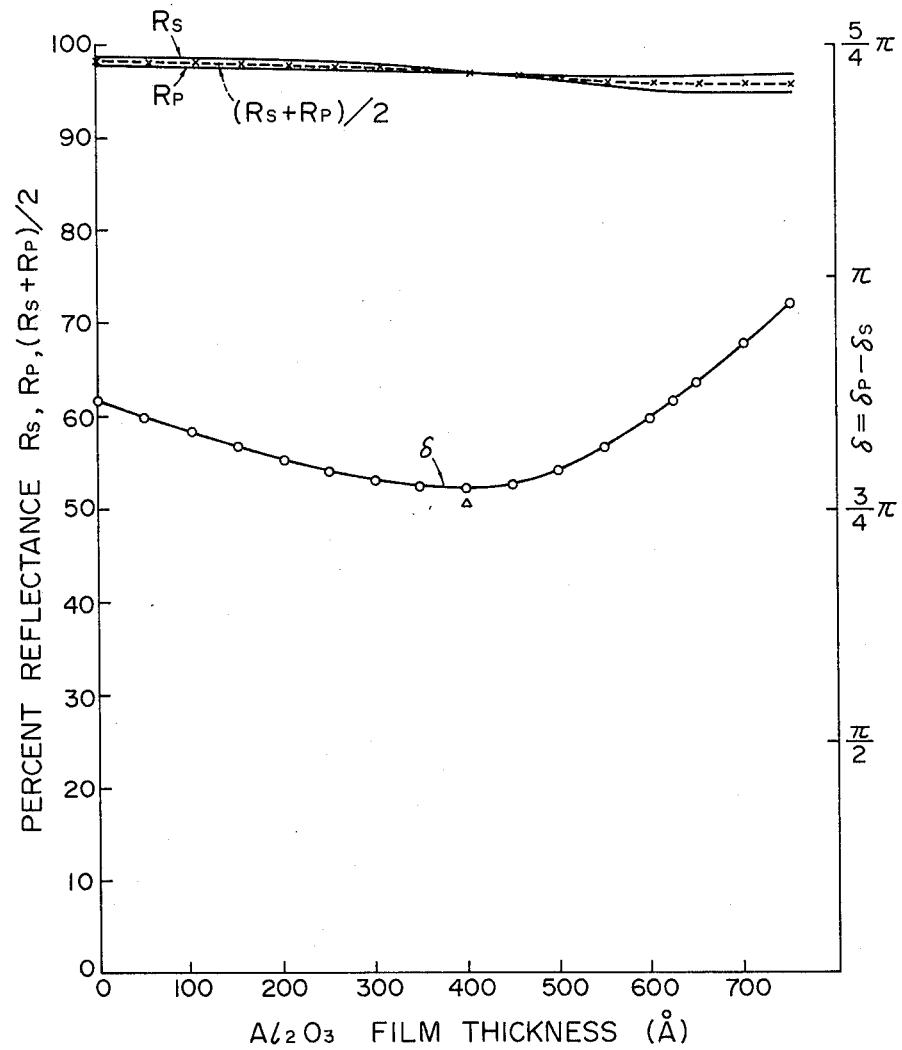

Fourth Embodiment:

As shown in FIG. 6 A and as in the first embodiment, the surface of silver deposited on a glass substrate by vacuum vaporization was coated with aluminum oxide Al$_2$O$_3$ to a thickness of 50–750 Å also by vacuum vaporization. The reflection factors and phase difference of the polarization components of the thus obtained mirror for the angle of incidence 45° and the wavelength of the light 5460 Å are shown in FIG. 6 B.

As shown in FIG. 6 B, there was obtained a phase shifting mirror having a reflection factor 95% or more for the range ($1.55\pi/2$-$1.94\pi/2$ of the phase difference $\delta = \delta_P - \delta_S$. In order that the phase difference $\delta$ may be small, the effective film thickness of $Al_2O_3$ may be between 1/16.9 and 1/7.22. Further, the energies of $R_P$ and $R_S$ become equal when $\delta$ is in the vicinity of $\frac{3}{4}\pi$.

Figure 7A:
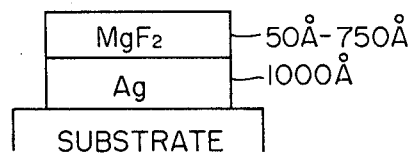
Figure 7B:
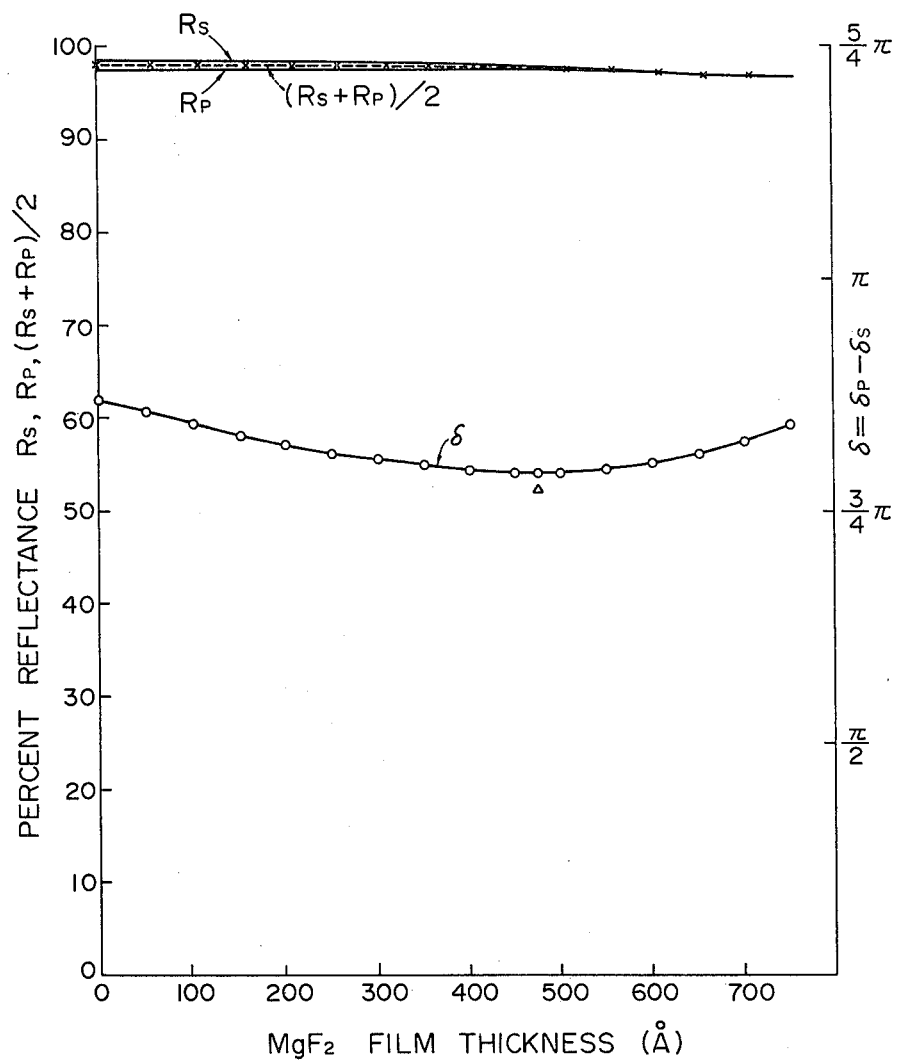

Fifth Embodiment:

As shown in FIG. 7 A and as in the first embodiment, the surface of silver deposited on a glass substrate by vacuum vaporization was coated with magnesium fluoride $MgF_2$ to a thickness of 50-750 Å also by vacuum vaporization. The reflection factors and phase difference of polarization components of the thus obtained mirror for the angle of incidence 45° and the wavelength of the light 5460 Å are shown in FIG. 7 B. As shown in FIG. 7 B, there was obtained a phase shifting mirror having a reflection factor 97% or more for the range $1.58\pi/2$-$1.70\pi/2$ of the phase difference $\delta = \delta_P - \delta_S$. In order that the phase difference $\delta$ may be small, the effective film thickness of $MgF_2$ may be between 1/20.5 and 1/6.78 of the design wavelength. Further, the energies of $R_S$ and $R_P$ become equal when $\delta$ is in the vicinity of $\frac{3}{4}\pi$.

Figure 8A:
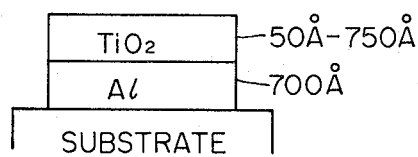
Figure 8B:
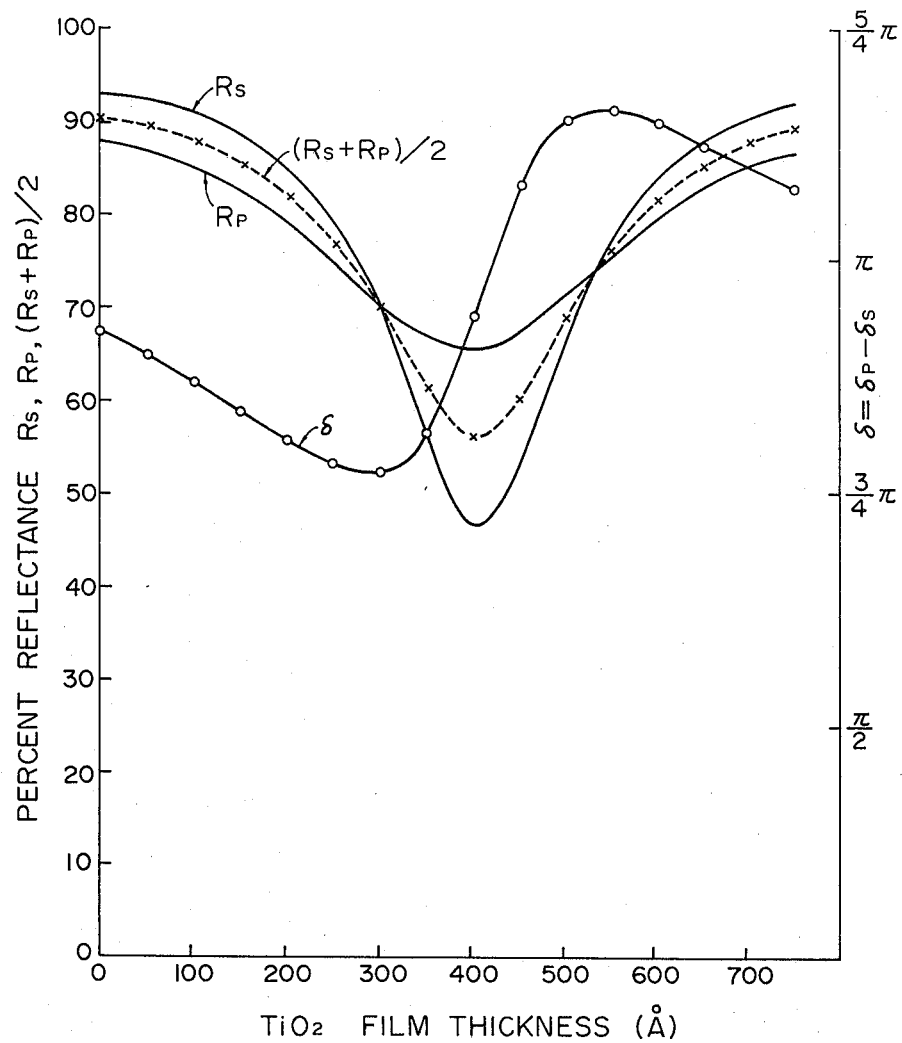

Sixth Embodiment:

As shown in FIG. 8 A, a glass substrate well polished and having the surface thereof kept sufficiently clean was disposed in a vacuum tank maintained at the pressure of $10^{-6}$-$5\times10^{-5}$ mmHg, and aluminum was deposited on the glass substrate to a thickness which does not pass light (700 Å or more), by the well-known vacuum vaporization technique. Further, the surface of the aluminum film was coated with titanium dioxide $TiO_2$ to a thickness of 50-750 Å by similar vacuum vaporization technique.

The reflection factors and phase difference of polarization components of the thus obtained mirror for the angle of incidence 45° and the wavelength of the light 5460 Å are shown in FIG. 8 B.

As shown in FIG. 8 B, there was obtained a phase shifting mirror having an average reflection factor 60-90% for the range $1.55\pi/2$-$2.32\pi/2$ of the phase difference $\delta = \delta_P - \delta_S$. In order that the phase difference $\delta$ may be small, the effective film thickness of $TiO_2$ may be between (1/9.9) and (1/6.42) of the design wavelength. Further, the energies of $R_S$ and $R_P$ become equal when $\delta$ is in the vicinity of $\frac{3}{4}\pi$.

Figure 9A:
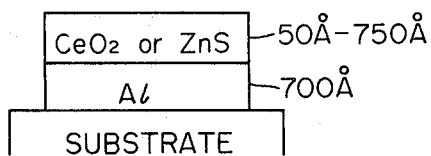
Figure 9B:
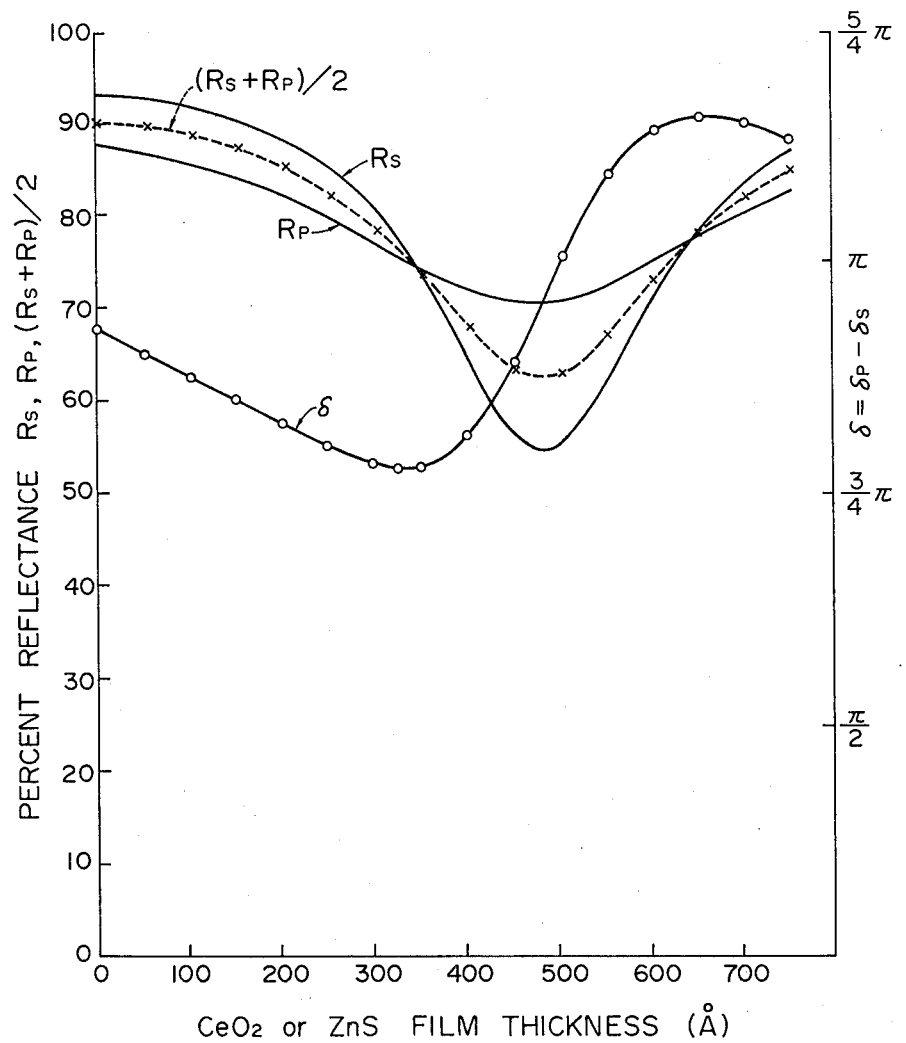

Seventh Embodiment:

As shown in FIG. 9 A and as in the sixth embodiment, the surface of aluminum deposited on a glass substrate by vacuum vaporization was coated with cerium oxide $CeO_2$ or zinc sulfide ZnS to a thickness of 50-750 Å also by vacuum vaporization. The reflection factors and phase difference of polarization components of the thus obtained mirror for the angle of incidence 45° and the wavelength of the light 5460 Å are shown in FIG. 9 B.

As shown in FIG. 9, there was obtained a phase shifting mirror having an average reflection factor 62-90% for the range $1.55\pi/2$-$2.32\pi/2$ of the phase difference $\delta = \delta_P - \delta_S$. In order that the phase difference $\delta$ may be small, the effective film thickness of the dielectric layer may be between 1/9.98 and 1/6.38 of the design wavelength. Further, the energies of $R_P$ and $R_S$ become equal when $\delta$ is in the vicinity of $\frac{3}{4}\pi$.

Figure 10A:
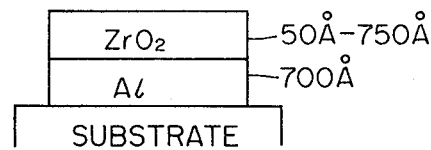
Figure 10B:
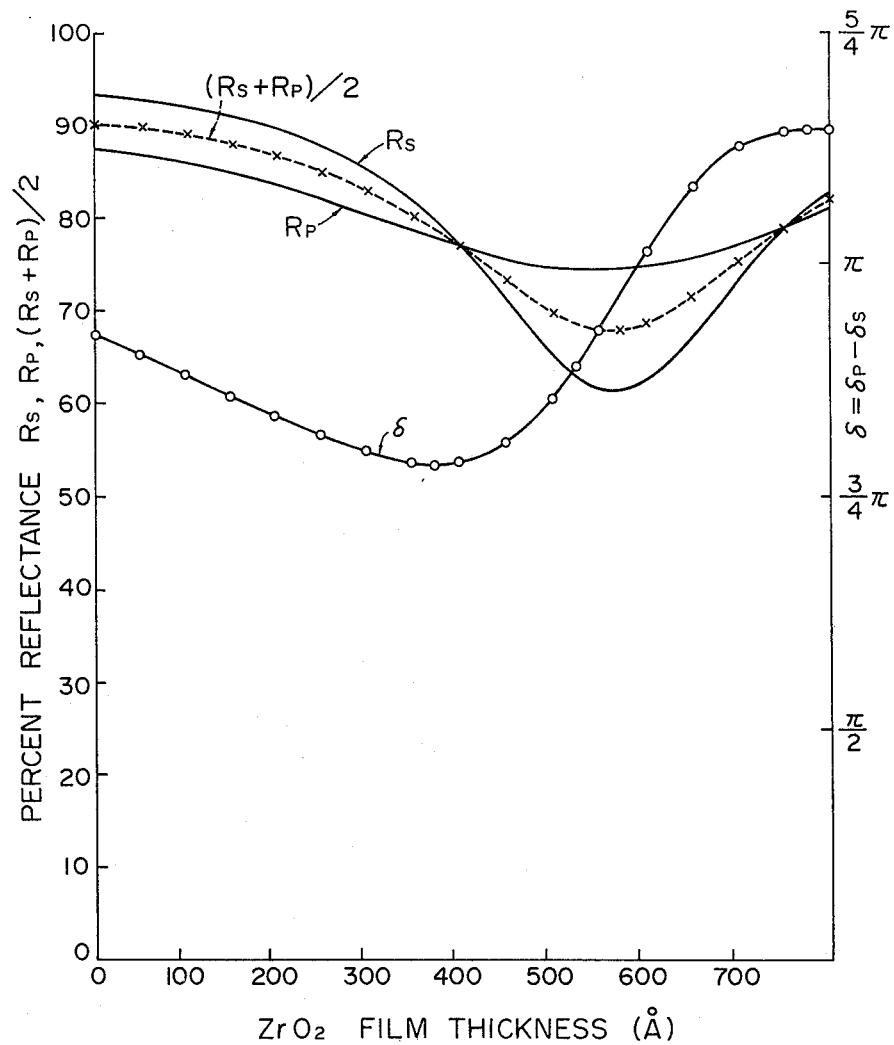

Eighth Embodiment:

As shown in FIG. 10 A and as in the sixth embodiment, the surface of aluminum deposited on a glass substrate by vacuum vaporization was coated with zirconium oxide $ZrO_2$ to a thickness of 50-750 Å also by vacuum vaporization. The reflection factors and phase difference of polarization components of the thus obtained mirror for the angle of incidence 45° and the wavelength of the light 5460 Å are shown in FIG. 10 B.

As shown in FIG. 10 B, there was obtained a phase shifting mirror having an average reflection factor 68-90% for the range $1.57\pi/2$-$2.29\pi/2$ of the phase difference $\delta = \delta_P - \delta_S$. In order that the phase difference $\delta$ may be small, the effective film thickness of $ZrO_2$ may be between 1/10.9 and 1/6.32 of the design wavelength. It is also seen that the energies of $R_S$ and $R_P$ become equal when $\delta$ is in the vicinity of $\frac{3}{4}\pi$.

Figure 11A:
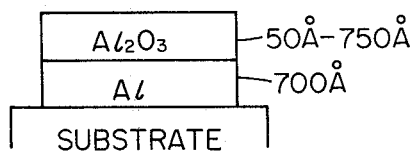
Figure 11B:
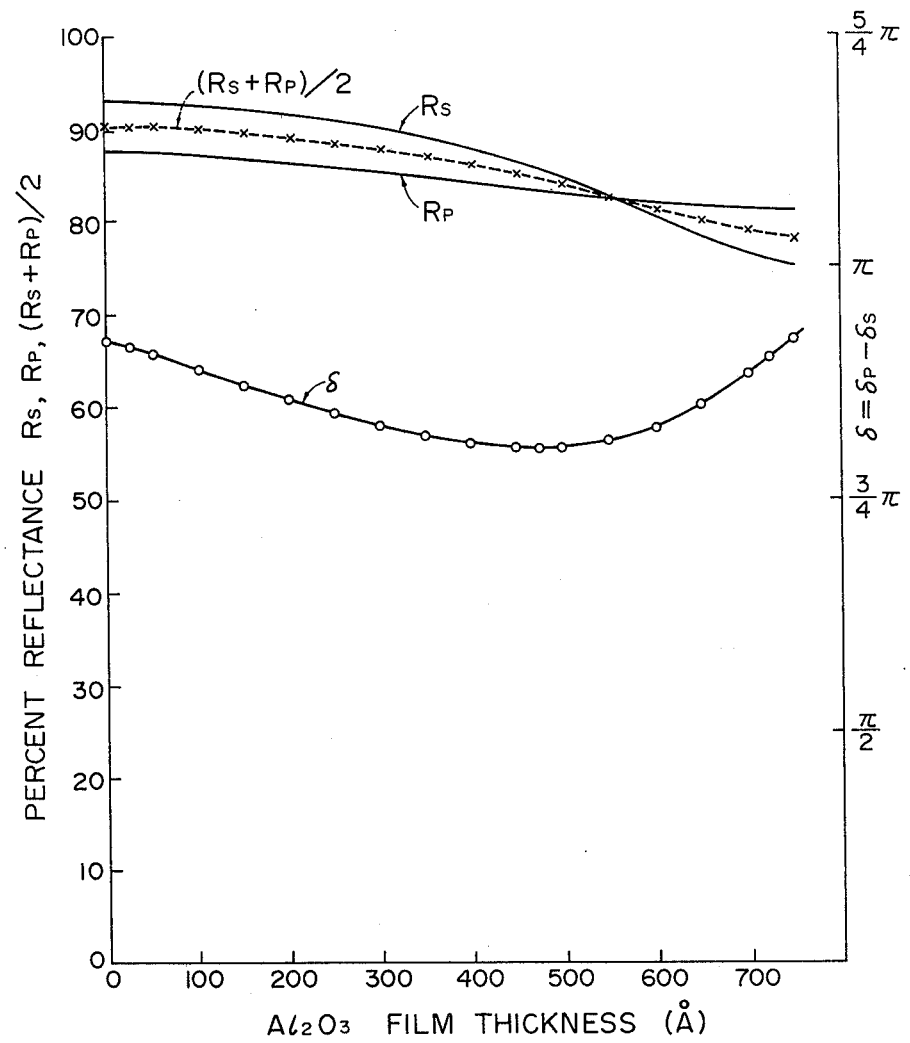

Ninth Embodiment:

As shown in FIG. 11 A and as in the sixth embodiment, the surface of aluminum deposited on a glass substrate by vacuum vaporization was coated with aluminum oxide $Al_2O_3$ to a thickness of 50-750 Å also by vacuum vaporization. The reflection factors and phase difference of polarization components of the thus obtained mirror for the angle of incidence 45° and the wavelength of the light 5460 Å are shown in FIG. 11 B.

As shown in FIG. 11 B, there was obtained a phase shifting mirror having an average reflection factor 78-90% for the range ($1.61\pi/2$-$1.85\pi/2$ of the phase difference $\delta = \delta_P - \delta_S$. In order that the phase difference $\delta$ may be small, the effective film thickness of $Al_2O_3$ may be between 1/12.39 and 1/6.09 of the design wavelength. It is further seen that the energies of $R_S$ and $R_P$ become equal when $\delta$ is in the vicinity of $\frac{3}{4}\pi$.

Figure 12A:
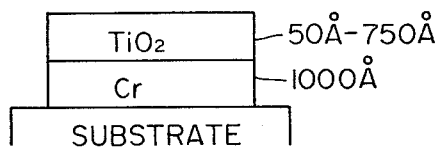
Figure 12B:
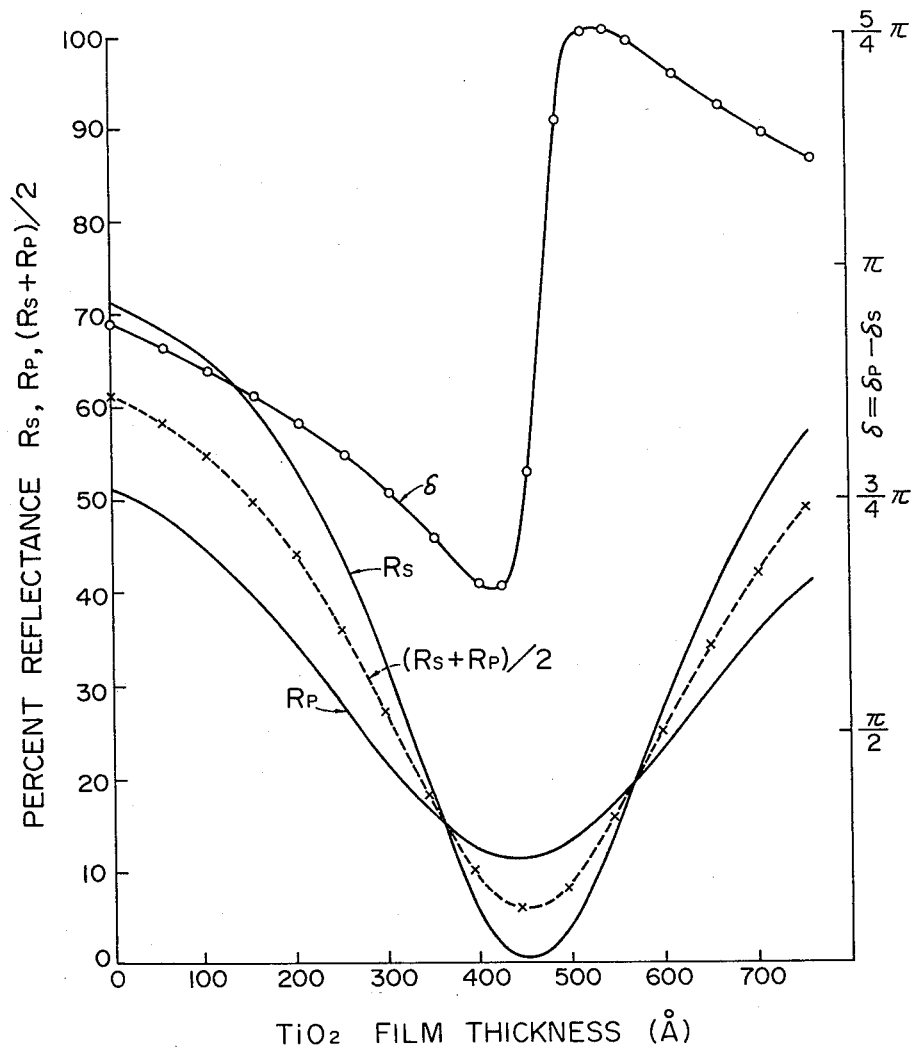

Tenth Embodiment:

As shown in FIG. 12 A, a glass substrate well polished and having the surface thereof kept sufficiently clean was disposed in a vacuum tank maintained at a pressure of $10^{-6}$-$5\times10^{-5}$ mmHg, and chromium was deposited on the glass substrate to a thickness which does not pass light (1000 Å or greater) by the well-known vacuum vaporization technique. Further, the surface of chromium was coated with titanium dioxide $TiO_2$ by similar vacuum vaporization. The reflection factors and phase difference of polarization components of the thus obtained mirror for the angle of incidence 45° and the wavelength of the light 5460 Å are shown in FIG. 12 B. As shown in FIG. 12 B, there was obtained a phase shifting mirror having an average reflection 6-60% for the range $1.30\pi/2$-$2.5\pi/2$ of the phase difference $\delta = \delta_P - \delta_S$. In order that the phase difference $\delta$ may be small, the effective film thickness of $TiO_2$ may be 1/6.21 and 1/5.48 of the design wavelength. It is also seen that the energies of $R_S$ and $R_P$ become equal when $\delta$ is in the vicinity of $\frac{3}{4}\pi$.

Figure 13A:
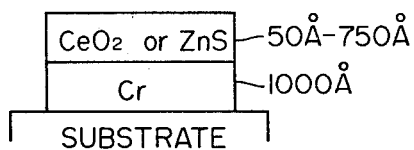
Figure 13B:
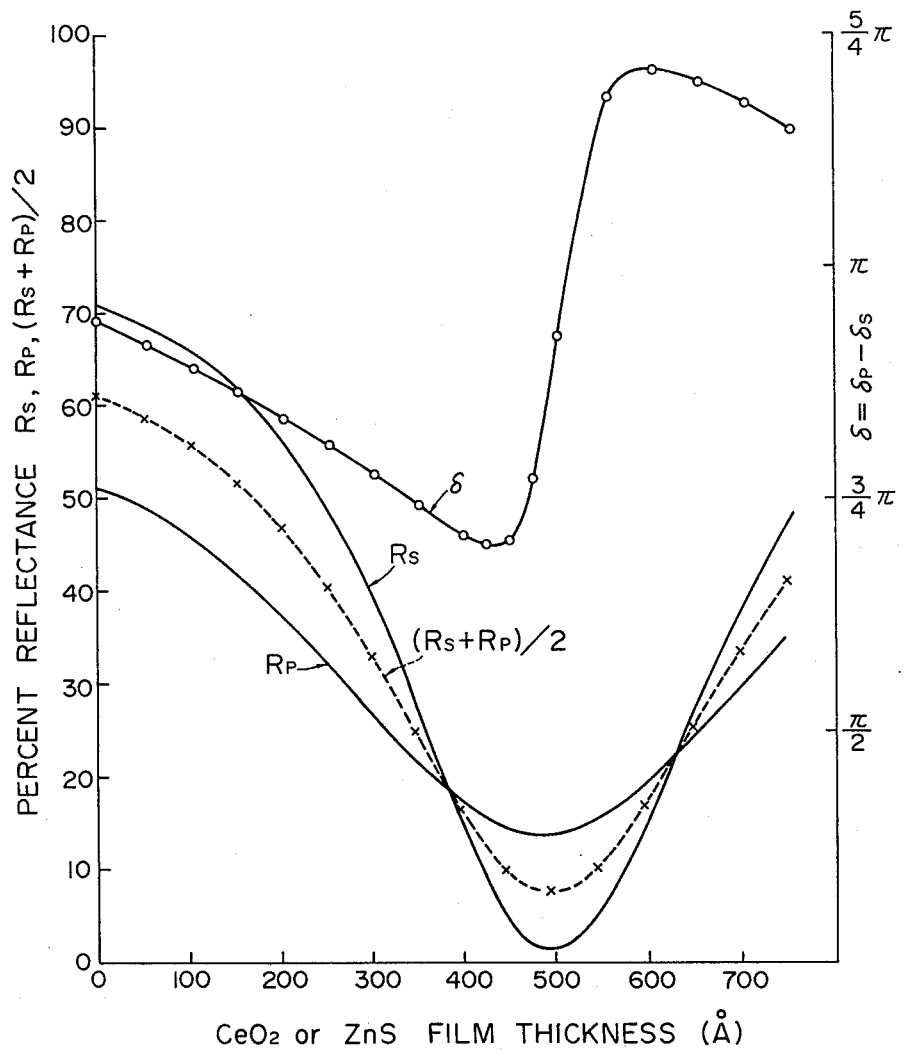

Eleventh Embodiment:

As shown in FIG. 13 A and as in the tenth embodiment, the surface of chromium deposited on a glass substrate by vacuum vaporization was coated with cerium oxide $CeO_2$ or zinc sulfide ZnS to a thickness of 50-750 Å also by vacuum vaporization. the reflection factors and phase difference of polarization components of the thus obtained mirror for the angle of incidence 45° and the wavelength of the light 5460 Å are shown in FIG. 13 B.

As shown in FIG. 13 B, there was obtained a phase shifting mirror having an average reflection factor 8-60% for the range $1.4\pi/2$-$2.43\pi/2$ of the phase difference $\delta=\delta_P-\delta_S$. In order that the phase difference $\delta$ may be small, the effective film thickness of the dielectric layer may be between 1/6.65 and 1/5.36 of the design wavelength. It is further seen that the energies of $R_S$ and $R_P$ become equal when $\delta$ is in the vicinity of $\frac{3}{4}\pi$.

Figure 14A:
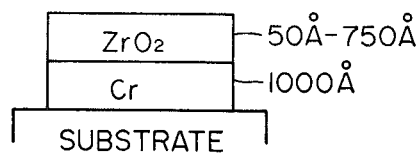
Figure 14B:
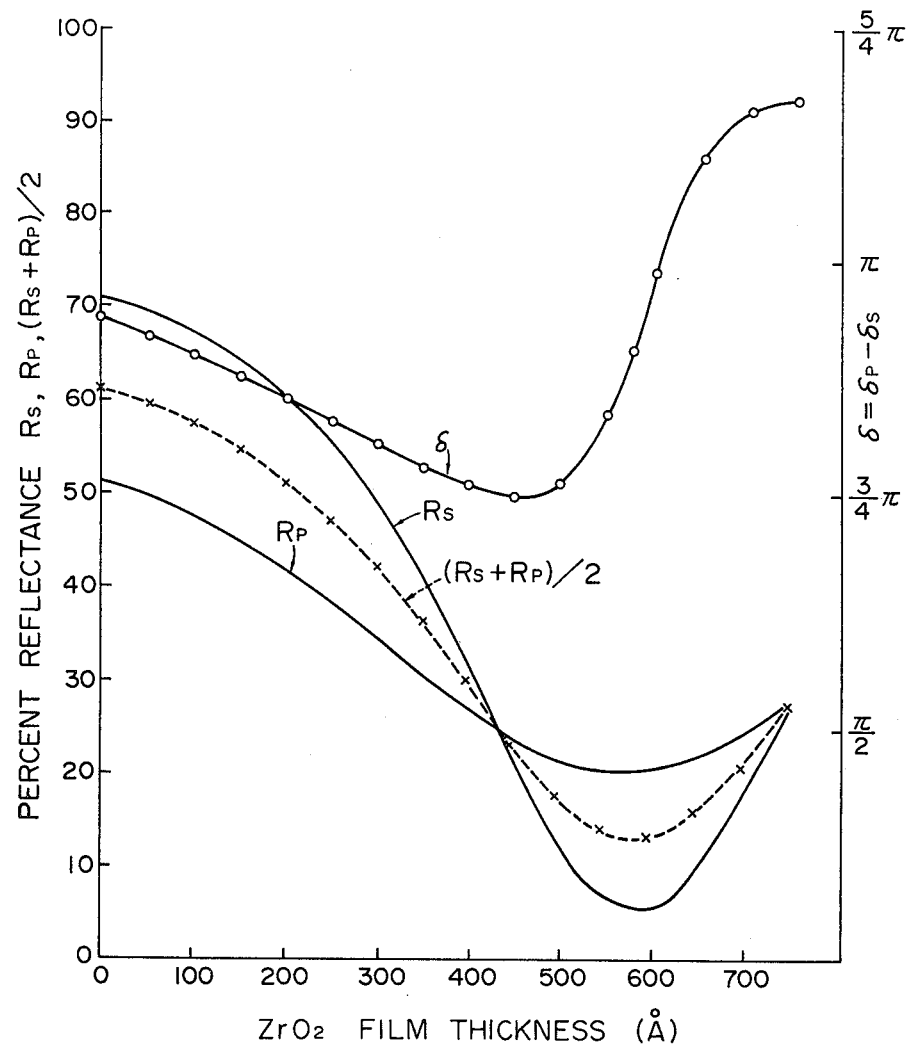

Twelfth Embodiment:

As shown in FIG. 14 A and as in the tenth embodiment, the surface of chromium deposited on a glass substrate by vacuum vaporization was coated with zirconium oxide $ZrO_2$ to a thickness of 50–750 Å also by vacuum vaporization. The reflection factors and phase difference of polarization components of the thus obtained mirror for the angle of incidence 45° and the wavelength of the light 5460 Å are shown in FIG. 14 B. As shown in FIG. 14 B, there was obtained a phase shifting mirror having an average reflection factor 13–60% for the range $1.5\pi/2-2.35\pi/2$ of the phase difference $\delta=\delta_P-\delta_S$. In order that the phase difference $\delta$ may be small, the effective film thickness of $ZrO_2$ may be between 1/7.88 and 1/5.57 of the design wavelength. It is further seen that the energies of $R_S$ and $R_P$ become equal when $\delta$ is in the vicinity of $\frac{3}{4}\pi$.

Figure 15A:
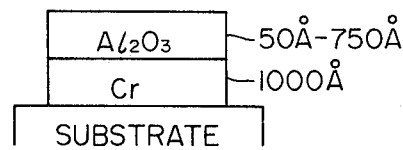
Figure 15B:
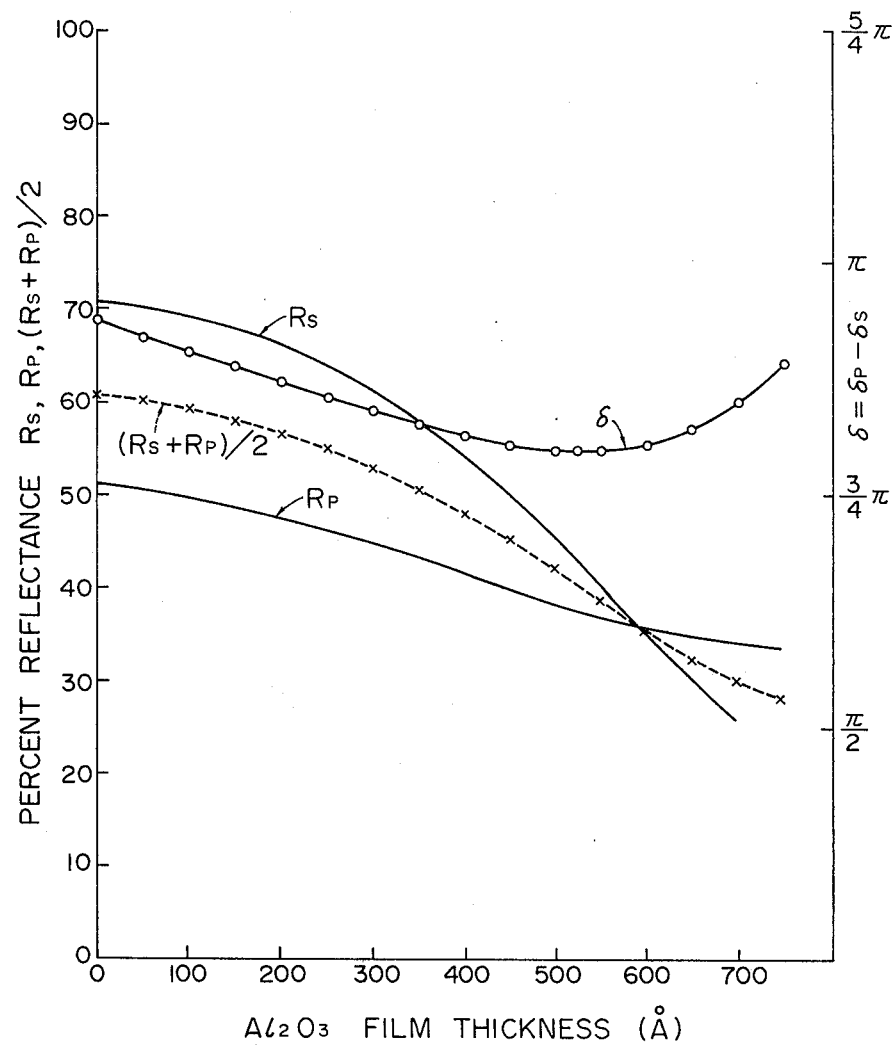

Thirteenth Embodiment:

As shown in FIG. 15 A and as in the tenth embodiment, the surface of chromium deposited on a glass substrate by vacuum vaporization was coated with aluminum oxide $Al_2O_3$ to a thickness of 50–750 Å also by vacuum vaporization. The reflection factors and phase difference of polarization components of the thus obtained mirror for the angle of incidence 45° and the wavelength of the light 5460 Å are shown in FIG. 15 B. As shown in FIG. 15 B, there was obtained a phase shifting mirror having an average reflection factor 29–60% for the range $1.6\pi/2-1.8\pi/2$ of the phase difference $\delta=\delta_P-\delta_S$. In order that the phase difference $\delta$ may be small, the effective film thickness of $Al_2O_3$ may be between 1/10.62 and 1/5.72 of the design wavelength.

Figure 16A:
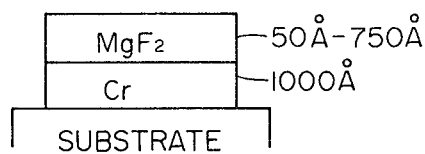
Figure 16B:
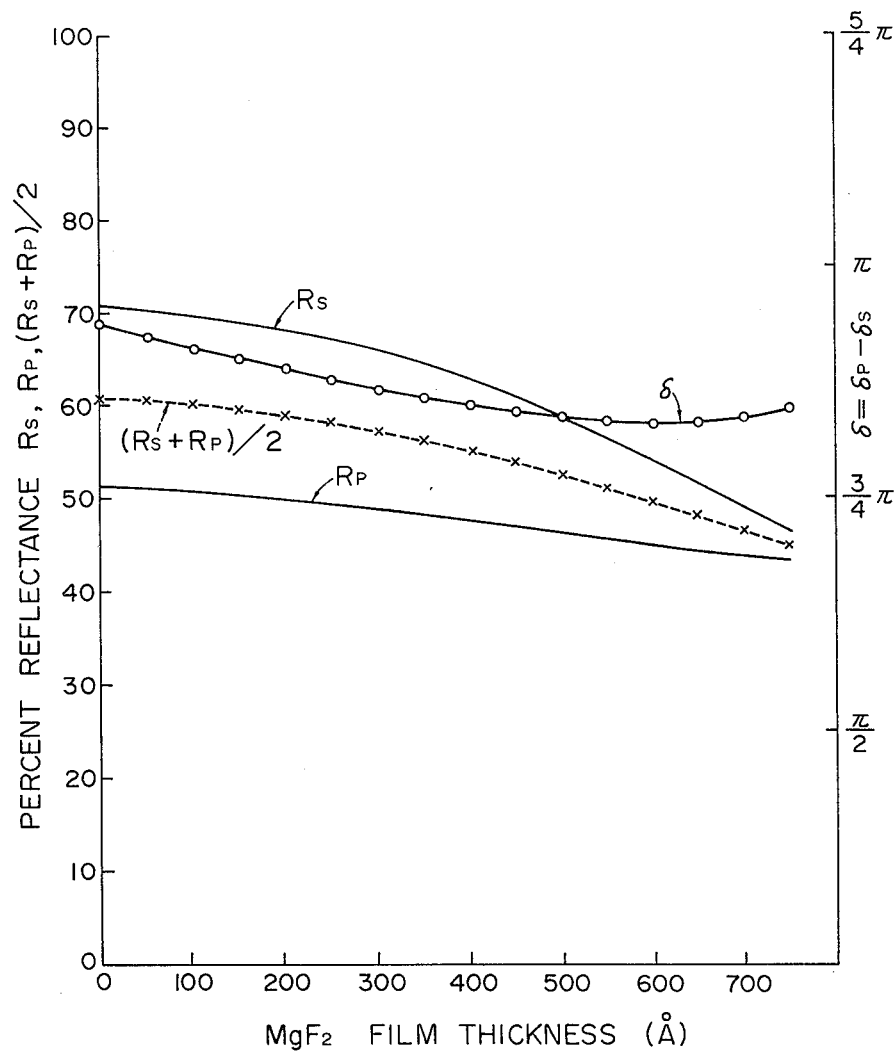

Fourteenth Embodiment:

As shown in FIG. 16 A and as in the tenth embodiment, the surface of chromium deposited on a glass substrate by vacuum vaporization was coated with magnesium fluoride $MgF_2$ to a thickness of 50–750 Å also by vacuum vaporization. The reflection factors and phase difference of the thus obtained mirror for the angle of incidence 45° and the wavelength of the light 5460 Å are shown in FIG. 16 B. As shown in FIG. 16 B, there was obtained a phase shifting mirror having an average reflection factor 45–60% for the range $1.64\pi/2-1.75\pi/2$ of the phase difference $\delta=\delta_P-\delta_S$. In order that the phase difference $\delta$ may be small, the effective film thickness of $MgF_2$ may be between 1/12.8 and 1/5.83 of the designed wavelength.

Figure 17A:
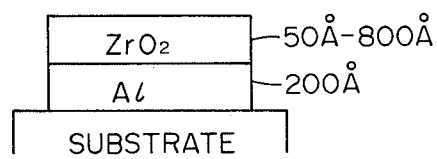
Figure 17B:
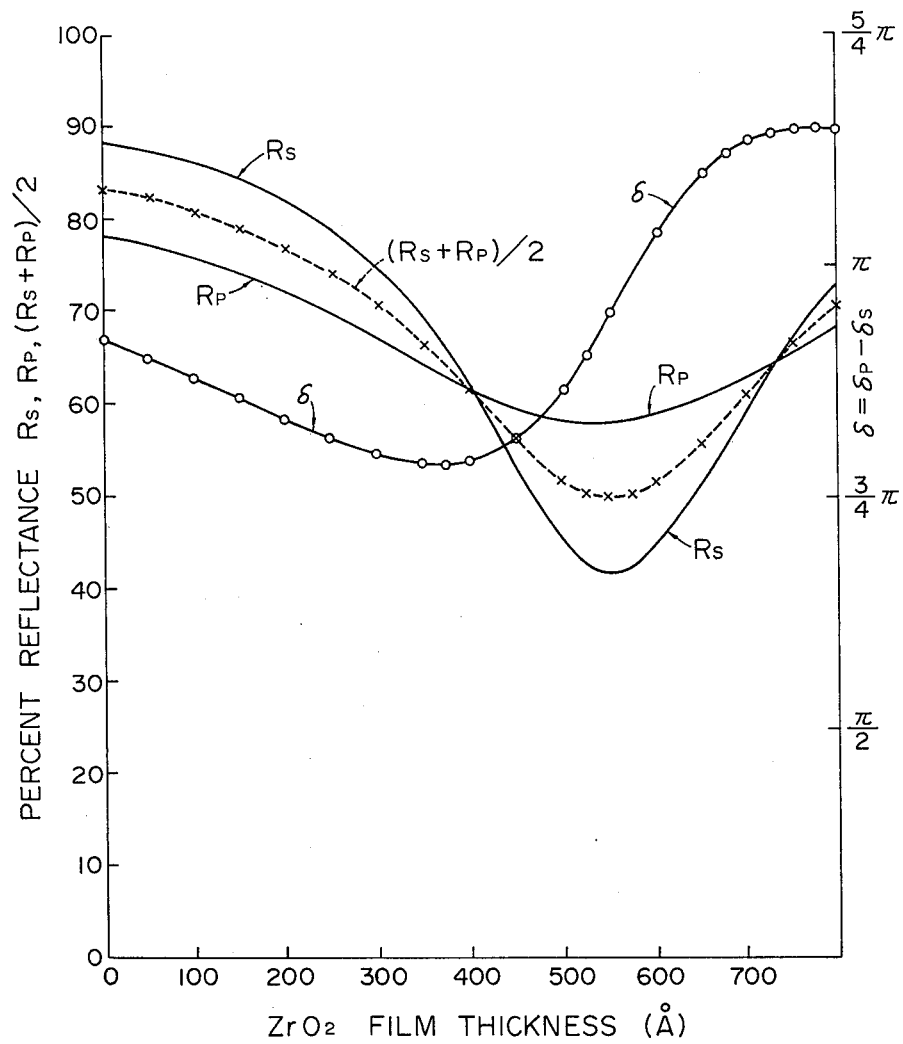

Fifteenth Embodiment:

As shown in FIG. 17 A, a glass substrate well polished and having the surface thereof kept sufficiently clean was disposed in a vacuum tank maintained at a pressure of $10^{-6}-5\times10^{-7}$ mmHg, and aluminum was deposited on the glass substrate to a thickness of 200 Å by the well-known vacuum vaporization technique. Further, the surface of the aluminum was coated with zirconium oxide $ZrO_2$ to a thickness of 50–800 Å by similar vacuum vaporization technique. The reflection factors and phase difference of polarization components of the thus obtained mirror for the angle of incidence 45° and the wavelength of the light 5460 Å are shown in FIG. 17 B. As shown in FIG. 17 B, there was obtained a phase shifting mirror having an average reflection factor 50–83% for the range $1.56\pi/2-2.30\pi/2$ of the phase difference $\delta=\delta_P-\delta_S$. When this embodiment is compared with the eighth embodiment which differs only in the thickness of aluminum from this embodiment, it is seen that this embodiment is lower in reflection factor and greater in the variation in phase difference. The phase shifting mirror of the present embodiment is a half-mirror through which part of the light passes. In order that the phase difference $\delta$ may be small, the effective film thickness of $ZrO_2$ may be between 1/10.5 and 1/6.46 of the design wavelength. It is also seen that the energies of $R_P$ and $R_S$ become equal when $\delta$ is in the vicinity of $\frac{3}{4}\pi$.

Figure 18A:
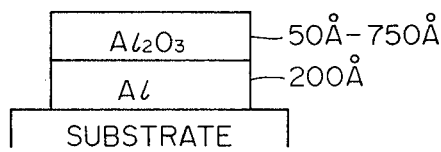
Figure 18B:
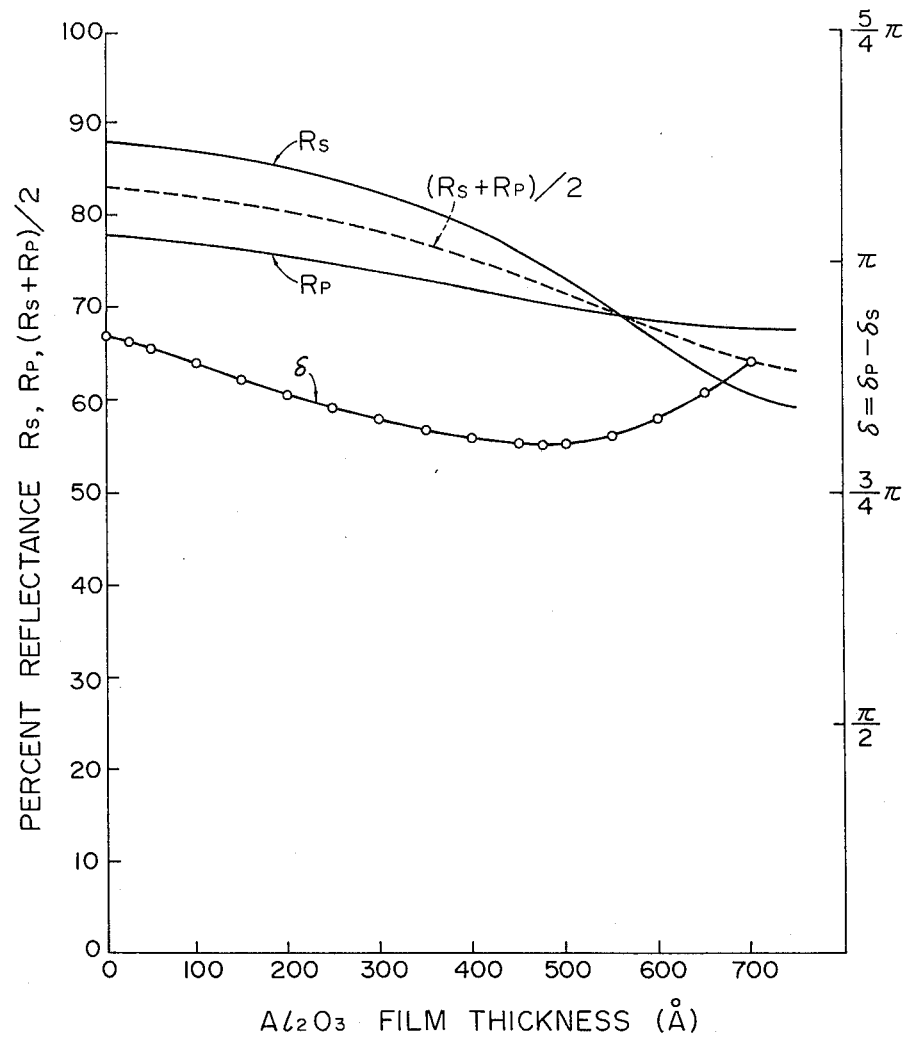

Sixteenth Embodiment:

As shown in FIG. 18 A and as in the fifteenth embodiment, aluminum was deposited on polished optical glass (BK 7) to a thickness of 200 Å by vacuum vaporization, and further the surface of the aluminum was coated with aluminum oxide $Al_2O_3$ to a thickness of 750 Å by similar vacuum vaporization technique. The reflection factors and phase difference of polarization components of the thus obtained mirror for the angle of incidence 45° and the wavelength of the light 5460 Å are shown in FIG. 18 B. As shown in FIG. 18 B, there was obtained a phase shifting mirror having an average reflection factor 66–83% for the range $1.61\pi/2-1.80\pi/2$ of the phase difference $\delta=\delta_P-\delta_S$. When the present embodiment is compared with the ninth embodiment which differs only in the thickness of aluminum from the present embodiment, it is seen that the present embodiment is lower in reflection factor and there is little or no difference in phase difference between the two embodiments. The phase shifting mirror according to the present embodiment is a half-mirror through which part of the light passes. In order that the phase difference $\delta$ may be small, the effective film thickness of $Al_2O_3$ may be between 1/12.4 and 1/6.19 of the design wavelength.

Figure 19A:
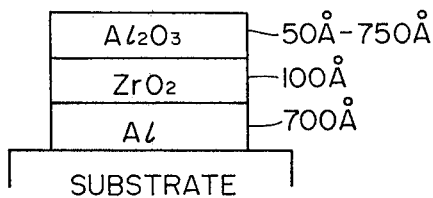
Figure 19B:
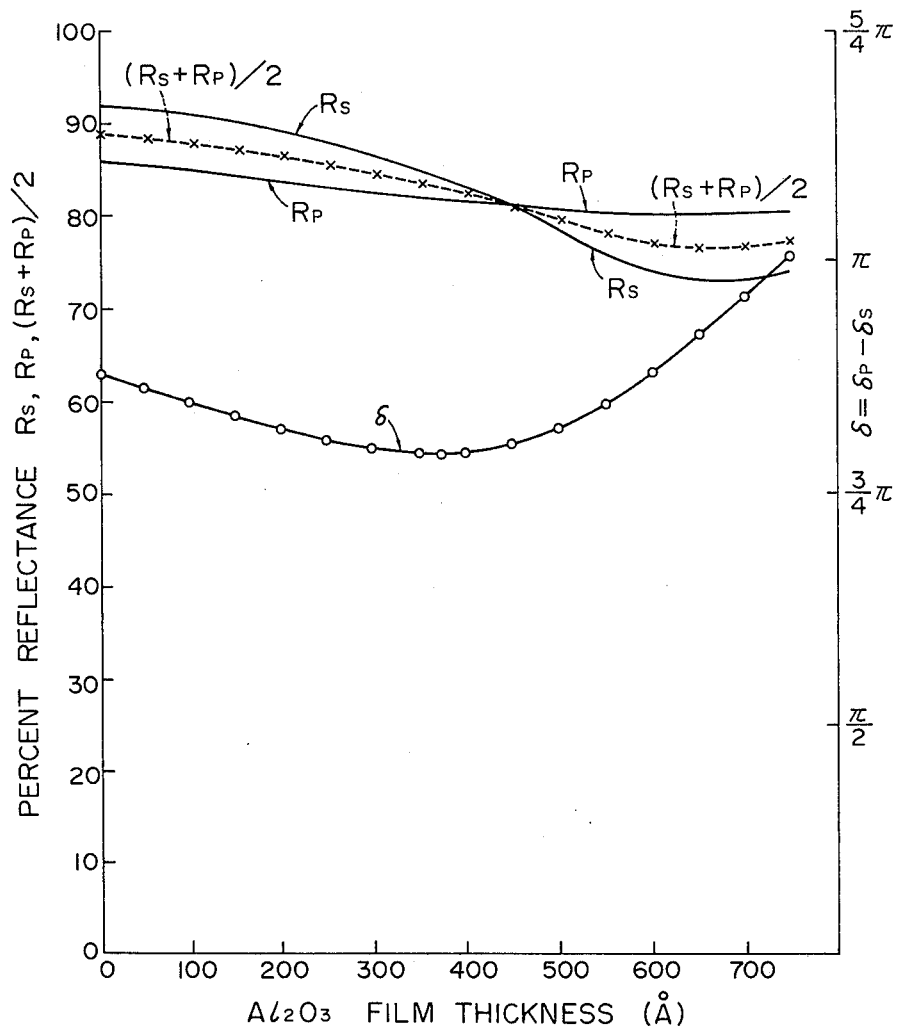

Seventeenth Embodiment:

As in the sixth embodiment, the surface of aluminum deposited on a glass substrate by vacuum vaporization was coated with zirconium oxide to a very small thickness of about 100 Å by similar vacuum vaporization technique and further, aluminum oxide $Al_2O_3$ was deposited on the zirconium oxide to a thickness of 50–750 Å by vacuum vaporization. The reflectors and phase difference of polarization components of the thus obtained mirror for the angle of incidence 45° and the wavelength of the light 5460 Å are shown in FIG. 19 B. As shown in FIG. 19 B, there was obtained a phase shifting mirror having an average reflection factor 76–86% for the range $1.58\pi/2-\pi$ of the phase difference $\delta=\delta_P-\delta_S$. The characteristic of the present embodiment for the wavelength 5460 Å is intermediate of that of the eighth embodiment and that of the ninth embodiment, but the reflection factor in the ultraviolet range is as high as in the ninth embodiment because the film of light absorbing zirconium oxide is very thin. In order that the phase difference $\delta$ may be small, the effective film thickness of $Al_2O_3$ may be between 1/18.6 and 1/7.4 of the design wavelength.

Eighteenth Embodiment:

As in the sixth embodiment, the surface of aluminum deposited on a glass substrate by vacuum vaporization was coated with magnesium fluoride to a thickness of 550 Å also by vacuum vaporization, and further zirconium oxide $ZrO_2$ was deposited on the surface of magnesium fluoride to a thickness of 50–800 Å by vacuum vaporization. The reflection factors and phase difference of polarization components of the thus obtained mirror for the angle of incidence 45° and the wavelength of the light 5460 Å are shown in FIG. 20 B.

Figure 20A:
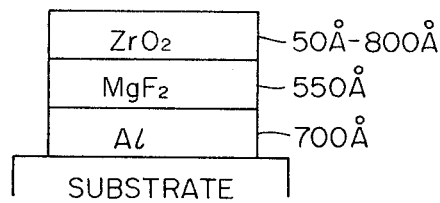
Figure 20B:
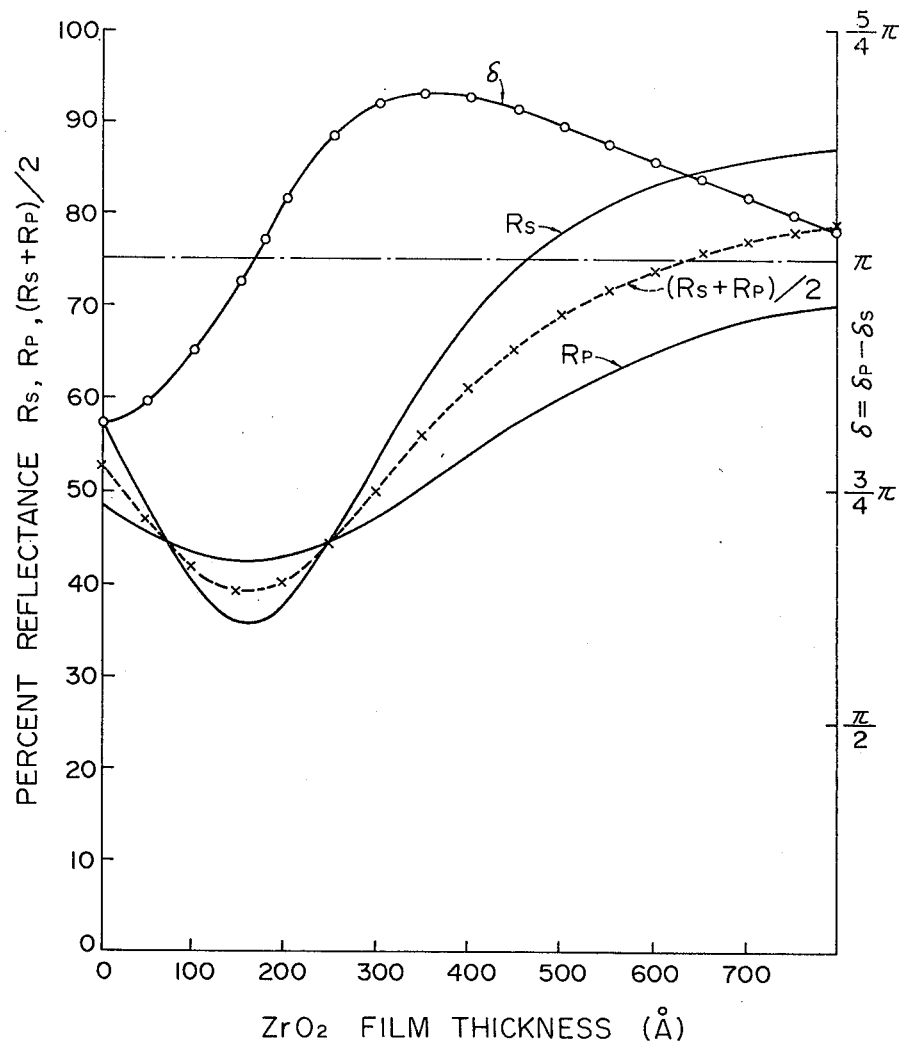

As shown in FIG. 20 B, there was obtained a phase shifting mirror having an average reflection factor 80-94% for the range $1.56\pi/2-2.37\pi/2$ of the phase difference $\delta=\delta_p-\delta_S$. As compared with other embodiments in which aluminum is used as the metal layer, the phase shifting mirror of the present embodiment is relatively high in reflection factor.

As shown in FIG. 20 B, in the present embodiment, as the film thickness of $ZrO_2$ is increased, the phase difference $\delta$ becomes greater and assumes a maximum value. Even in such a case, the phase difference assumes a value far from $\pi$. In the present embodiment, a mirror having a great phase difference may be obtained if the effective film thickness of $ZrO_2$ is between $(1/10.3)$ and $(1/6.0)$ of the design wavelength.

The present invention has so far been described with respect to its principle and embodiments. When a reflection phase shifting optical system is to be constructed by using the phase shifting mirror according to the present invention, it may be achieved by increasing the number of the phase shifting mirrors to a plurality depending on the intended purpose, or by changing the angle of incidence, or by suitably selecting the construction of the phase shifting mirror.

Where the mirror is used as a phase shifting mirror for visible light and used as an ordinary mirror for the ultraviolet or infrared range, the quality of the materials and film thicknesses of the metal and dielectric layers forming the phase shifting mirror must be chosen in accordance with the intended purpose. For example, in a phase shifting mirror which must be high in reflection factor for the ultraviolet range, aluminum must be used as the metal layer and magnesium fluoride, aluminum oxide, silicon oxide, thorium fluoride or the like must be employed as the thin dielectric film. Also, where a phase shifting mirror which is high in reflection factor for the near-infrared and infrared range is to be obtained, gold or copper may be used as the metal layer, in addition to those materials mentioned in the abovedescribed embodiments.

Figure 21:
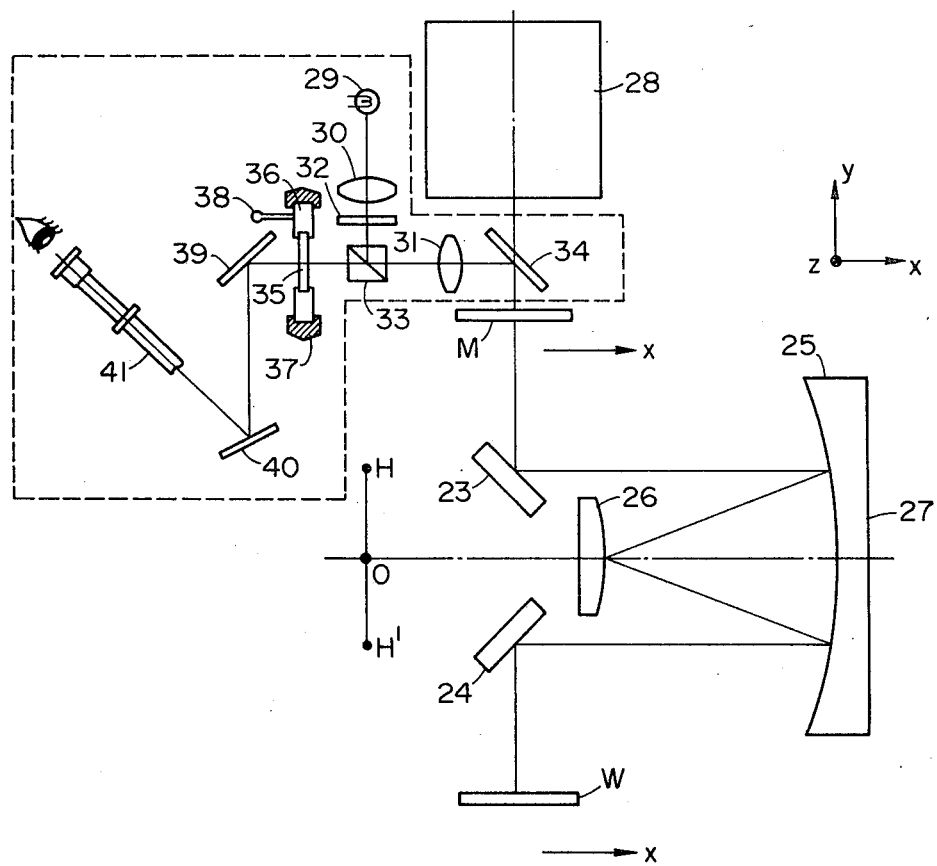
FIG. 21 schematically shows an embodiment of the optical system to which the phase shifting mirror of the present invention is applied.

Description will now be made of an embodiment of the optical system to which the phase shifting mirror according to the present invention is applied. The optical system shown in FIG. 21 is an observation device for mask and wafer for manufacturing semiconductor circuit elements to which the present invention is applied. In FIG. 21, the observation device is shown in inspection condition and during printing, means such as the optical system indicated within a broken line is deviated from a printing light path, as will hereinafter be described. The reflecting optical system for projecting the pattern of a mask M upon a wafer W comprises plane mirrors 23, 24, a concave mirror 25 and a convex mirror 26, and the centers of curvature of the concave mirror 25 and the convex mirror 26 both lie at a point 0 on the optic axis 27. The plane mirrors 23 and 24 are used to bend the light path and in no way contributes to the image forming performance and therefore, if it is neglected, an object point at a height H from the point 0 is imaged as H' symmetric with respect to the optic axis without aberration and at one-to-one magnification. However, since the area without aberration is restricted to the neighborhood of H, an arc having a radius H is used. H and H' respectively correspond to the positions of the mask M and wafer W with the aid of the mirrors 23 and 24. When the mask M is illuminated in an arcuate form by an illuminating system 28 and the mask M and wafer W are parallel-moved in the direction X in the plane of the drawing sheet at the same time, the pattern of the mask M is printed on the whole surface of the wafer W. A light source 29 is an inspection illuminating light source and it illuminates the surface of the mask M through lenses 30 and 31. Designated by 33 is a half-mirror, 34 a mirror, and 32 a polarizing plate for bending and directing the light path to the mask M and taking the polarization direction of the illuminating light directed to the mask M at the azimuth of 45° with respect to the X-axis. The regular reflected light from the back side of the mask M passes through the mirror 34, the lens 31 and the half-mirror 33 to a polarizing plate 35, which is rotated so as to prevent this incident light from passing through. The mechanism for rotating the polarizing plate 35 comprises a rotatable support 36 having a cylindrical surface and a fixed support 37 having a cylindrical guide, and may be rotated by means of a knob 38.

The mirrors 23 and 24 are provided by the phase shifting mirrors of the present invention. Since a phase difference of $\frac{3}{4}\pi$ may be created in each of these mirrors, the beam of rectilinearly polarized light having passed through the mask M becomes circularly polarized light when it reaches the wafer W. The light beam reflected by the wafer W again passes through the reflecting optical system 24, 25, 26, 23 and returns to the mask M and at this time, the light beam is again inparted a phase difference by the phase shifting mirrors 23 and 24, so that the light beam reaching the mask M becomes a rectilinearly polarized light. However, the polarization plane of the light beam at this time is orthogonal with the polarization plane of the illuminating light beam from the light source which is incident on the mask M. The mask M is also illuminated by the reflected light from the wafer W and such light is scattered by the pattern of the mask M, but such scattered light is in the same polarized condition as the reflected light from the wafer. Accordingly, the reflected light from the wafer W and the scattered light of the mask M illuminated by such reflected light pass through the mirror 34, the lens 31, the half-mirror 33 and the polarizing plate 35 to mirrors 39, 40 and eyepiece 41. Accordingly, by looking into the eyepiece 41, it is possible to inspect the wafer W and the mask M. Since the mask surface and the wafer surface are in conjugate relationship, it is possible to eliminate any rectilinearly polarized component reflected by the back side of the mask M to thereby enable the images of the mask and wafer which are free of any flare resulting from the direct reflected light from the mask surface and which are of good contrast to be inspected simultaneously, thus enabling alignment between the mask and the wafer.

The construction for imparting the aforementioned phase difference of $(\frac{3}{4})\pi$, if use is made of, for example, the construction of the first embodiment (FIG. 3), may be achieved by selecting the film thickness of $TiO_2$ to approximately 250 Å, as is apparent from FIG. 3.

What we claim is

1. A phase shifting mirror comprising:
   a substrate;
   a layer of aluminum provided on said substrate, said layer having a thickness sufficient to prevent passage of light; and a single layer of dielectric material provided on said layer of aluminum, the effective film thickness of said dielectric layer being between 1/9.9 and 1/6.42 of a design wavelength of light.

2. A phase shifting mirror according to claim 1, wherein said dielectric layer is formed of one material selected from among $TiO_2$, $CeO_2$, ZnS, $ZrO_2$ and $Al_2O_3$.

3. A phase shifting mirror comprising:
a substrate;
a layer of chromium provided on said substrate, said layer having a thickness sufficient to prevent passage of light; and
a single layer of dielectric material provided on said layer of chromium, the effective film thickness of said dielectric layer being between 1/6.21 and 1/5.83 of a design wavelength of light.

4. A phase shifting mirror according to claim 3, wherein said dielectric layer is formed of one material selected from among $TiO_2$, $CeO_2$, ZnS, $ZrO_2$, $Al_2O_3$ and $MgF_2$.

5. A phase shifting mirror comprising:
a substrate;
a layer of aluminum provided on said substrate, said layer having a thickness sufficient to prevent passage of light; and
a thin layer of $ZrO_2$ provided on said layer of aluminum, the effective film thickness of said layer of $ZrO_2$ being between 1/10.5 and 1/6.46 of a design wavelength of light.

6. A phase shifting mirror comprising:
a substrate;
a layer of aluminum provided on said substrate, said layer having a thickness sufficient to pass light; and
a thin layer of $Al_2O_3$ provided on said layer of aluminum, the effective film thickness of said layer of $Al_2O_3$ being between 1/12.4 and 1/6.19 of a design wavelength of light.

7. A phase shifting mirror comprising:
a substrate;
a layer of aluminum provided on said substrate, said layer having a thickness sufficient to prevent passage of light;
a layer of zirconium oxide provided on said layer of aluminum and having a film thickness of 100 Å; and
a layer of aluminum oxide provided on said layer of zirconium oxide, the effective film thickness of said layer of aluminum oxide being between 1/18.6 and 1/7.4 of a design wavelength of light.

8. A phase shifting mirror comprising:
a substrate;
a layer of aluminum provided on said substrate, said layer having a thickness sufficient to prevent passage of light;
a layer of magnesium fluoride provided on said layer of aluminum, said layer having a film thickness of 550 Å; and
a layer of zirconium oxide provided on said layer of magnesium fluoride, the effective film thickness of said layer of zirconium oxide being between 1/10.3 and 1/6.0 of a design wavelength of light.

* * * * *

UNITED STATES PATENT AND TRADEMARK OFFICE
CERTIFICATE OF CORRECTION

PATENT NO. : 4,322,130

DATED : March 30, 1982

INVENTOR(S) : SUSUMU ITO, ET AL.

It is certified that error appears in the above-identified patent and that said Letters Patent are hereby corrected as shown below:

Column 3, line 45, "i= $\sqrt{-1}, \overline{0_2}$" should be --i= $\sqrt{-1}$, $0_2$--

Column 4, line 40, "$\gamma_p$" should be --$\gamma_{\vec{p}}$--; same line, "$\gamma_{\vec{p}}$" should be --$\gamma_p$--.

Column 6, line 12, "A" should be --Å--.

Signed and Sealed this

Twenty-fifth Day of May 1982

[SEAL]

Attest:

GERALD J. MOSSINGHOFF

Attesting Officer

Commissioner of Patents and Trademarks